United States Patent
Ou et al.

(10) Patent No.: US 11,803,272 B1
(45) Date of Patent: Oct. 31, 2023

(54) TOUCH DEVICE AND DETECTION METHOD

(71) Applicant: Novatek Microelectronics Corp., Hsinchu (TW)

(72) Inventors: Chih Hsien Ou, Tainan (TW); ChengFeng Hsieh, Tainan (TW); Chin-Lin Lee, Hsinchu (TW); Che-Chia Hsu, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 17/889,401

(22) Filed: Aug. 17, 2022

(30) Foreign Application Priority Data

Apr. 29, 2022 (TW) .................................. 111116361

(51) Int. Cl.
  *G06F 3/041* (2006.01)
  *G06F 3/038* (2013.01)
  *G06F 3/0354* (2013.01)

(52) U.S. Cl.
  CPC ............ *G06F 3/0418* (2013.01); *G06F 3/038* (2013.01); *G06F 3/03545* (2013.01)

(58) Field of Classification Search
  CPC .................................................. G06F 3/0418
  See application file for complete search history.

(56) References Cited

U.S. PATENT DOCUMENTS

| | | | |
|---|---|---|---|
| 2014/0043279 A1* | 2/2014 | Pedersen | G06F 3/03545 345/174 |
| 2016/0239123 A1* | 8/2016 | Ye | G06F 3/04166 |
| 2018/0314364 A1* | 11/2018 | Yeh | G06F 3/0383 |

FOREIGN PATENT DOCUMENTS

| | | |
|---|---|---|
| TW | I408579 | 9/2013 |
| TW | M563583 | 7/2018 |
| TW | 202040351 | 11/2020 |
| TW | 723708 | 4/2021 |

OTHER PUBLICATIONS

"Office Action of Taiwan Counterpart Application", dated Jan. 17, 2023, p. 1-p. 7.

* cited by examiner

*Primary Examiner* — Chun-Nan Lin
(74) *Attorney, Agent, or Firm* — JCIPRNET

(57) ABSTRACT

Provided is an electronic device including a touch panel, a communication unit, and a processing unit coupled to the touch control panel and the communication unit. The communication unit sends a detection signal and receives a response signal based on the detection signal. The processing unit determines an operation mode of the electronic device based on the response signal. The operation mode includes a first mode and a second mode. An input signal source of the electronic device of the first mode includes a finger. The input signal source of the second mode includes the finger and a stylus. When the response signal includes a pen-tip signal of the stylus and a pen-ring signal of the stylus, the processing unit determines whether to set the operation mode to the second mode according to the numerical relationship between the pen-tip signal and the pen-ring signal.

22 Claims, 3 Drawing Sheets

TOUCH DEVICE AND DETECTION METHOD

CROSS-REFERENCE TO RELATED APPLICATION

This application claims the priority benefit of Taiwan applications serial no. 111116361, filed on Apr. 29, 2022. The entirety of the above-mentioned patent application is hereby incorporated by reference herein and made a part of this specification.

BACKGROUND

Technical Field

The disclosure relates to an electronic device, particularly to an electronic device and a detection method.

Description of Related Art

Touch technology has been widely applied to the electronic devices in use today to receive input signals. Generally, a user can touch and operate an electronic device with a finger. The user can also perform tasks by using stylus, which is a gadget that further improves the precision of the touch and provides various functions. The electronic device may be provided accordingly with a hand-only mode and a pen-and-hand mode for receiving touch signals from a finger or a stylus.

However, it is possible to have noise in environments where electronic devices are used. When affected by noise, the electronic device may have misjudgments, which in turn causes the electronic device to be in the wrong mode where touch accuracy is compromised.

SUMMARY

The disclosure provides an electronic device and a detection method capable of detecting the approach and withdrawal of a stylus effectively and accurately.

The electronic device of the disclosure includes a touch panel, a communication unit, and a processing unit. The communication unit is configured to send a detection signal. The communication unit is configured to receive a response signal according to the detection signal. The processing unit is coupled to the touch panel and the communication unit. The processing unit is configured to determine the operation mode of the electronic device based on the response signal. The operation mode includes a first mode and a second mode. The input signal source of the electronic device in the first mode includes a finger. The input signal source of the electronic device in the second mode includes the finger and a stylus. When the response signal includes the pen-tip signal of the stylus and the pen-ring signal of the stylus, the processing unit is configured to determine whether to set the operation mode to the second mode according to the numerical relationship between the pen-tip signal and the pen-ring signal.

The detection method of the disclosure is suitable for determining the operation mode of an electronic device including a touch panel. The detection method includes: sending a detection signal; receiving a response signal according to the detection signal; determining the operation mode based on the response signal, in which the operation mode includes a first mode and a second mode, the input signal source of the electronic device in the first mode includes a finger, and the input signal source of the electronic device in the second mode includes the finger and a stylus; and when the response signal includes a pen-tip signal of the stylus and a pen-ring signal of the stylus, determining whether to set the operation mode to the second mode according to the numerical relationship between the pen-tip signal and the pen-ring signal.

Based on the above, the electronic device and the detection method of the disclosure determine the operation mode of the electronic device according to the detection signal and the response signal as a way to prevent the electronic device from entering an incorrect operation mode and improve the user experience.

To make the above features and advantages of the disclosure more comprehensible, the following embodiments are described in detail with reference to the following drawings.

DESCRIPTION OF THE EMBODIMENTS

Figure 1:
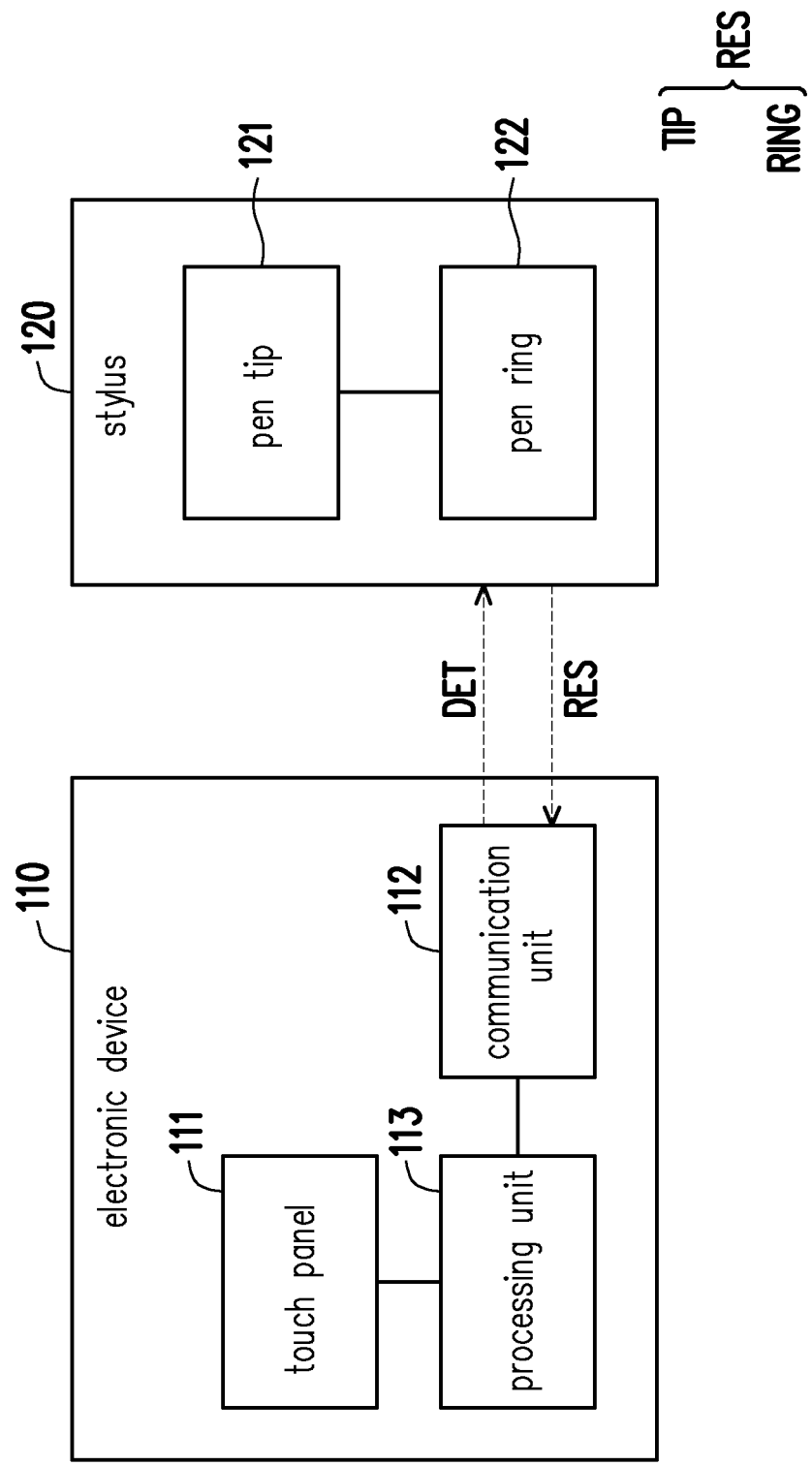
FIG. 1 is a schematic diagram of an electronic device according to an embodiment of the disclosure.

To make the content of the disclosure more comprehensible, the following embodiments are provided as examples according to which the disclosure can be implemented. In addition, wherever possible, elements/components/steps using the same reference numerals in the drawings and embodiments represent the same or similar parts.

Also, unless otherwise defined, all terms (including technical and scientific terms) used herein have the same meaning as commonly understood by one of ordinary skill in the art. Terms such as those defined in dictionaries commonly used should be construed to have meanings consistent with their meanings in the context of the related art and the disclosure, and are not to be construed as idealized or overly formal meanings, unless it is clearly defined so herein.

The disclosure can be understood by reference to the following detailed description with reference to the drawings. For the sake of easy understanding for the reader and for the simplicity of the drawings, the drawings in the disclosure may only depict a part of the electronic device, and specific elements in the drawings are not drawn according to actual scale. In addition, the number and size of each element in the figures are only for illustration purposes and are not for limiting the scope of the disclosure.

In the following embodiments, the technical features in several different embodiments can be replaced, reorganized, and mixed to form other embodiments without departing from the spirit of the disclosure. Moreover, words such as "comprising" and "including" are open-ended words in the following description and claims, as they should be interpreted as "including but not limited to."

FIG. 1 is a schematic diagram of an electronic device according to an embodiment of the disclosure. In FIG. 1, the electronic device 110 includes a touch panel 111, a communication unit 112, and a processing unit 113. The stylus 120 may include a pen tip 121 and a pen ring 122. The communication unit 112 is configured to send a detection signal DET. The communication unit 112 may be configured to receive a response signal RES according to the detection signal DET. The processing unit 113 is coupled to the touch panel 111 and the communication unit 112. The processing unit 113 is configured to determine the operation mode of the electronic device 110 based on the response signal RES. The operation mode includes a first mode and a second mode. The input signal source of the electronic device 110 in the first mode includes a finger. The input signal source of the electronic device 110 in the second mode includes the finger and the stylus 120. When the response signal RES may include a pen-tip signal TIP of a pen tip 121 of the stylus 120 and a pen-ring signal RING of a pen ring 122 of the stylus 120, the processing unit 113 is configured to determine whether to set the operation mode to the second mode according to the numerical relationship between the pen-tip signal TIP and the pen-ring signal RING. In this way, the processing unit 113 can determine the operation mode of the electronic device 110 according to the detection signal DET and the response signal RES as a way to prevent the electronic device 110 from entering an incorrect operation mode and improve the user experience.

In one embodiment, the electronic device 110 includes, for example, a mobile phone, a tablet computer, a notebook computer, a desktop computer, or other computing devices, which are not limited in the disclosure.

In one embodiment, the first mode of the operation mode of the electronic device 110 may be a hand-only mode, and the second mode of the operation mode of the electronic device 110 may be a pen-and-hand mode. In other words, the electronic device 110 in the first mode only receives signals from the finger, whereas the electronic device 110 in the second mode receives signals from the finger and signals from the stylus 120 simultaneously.

In one embodiment, the detection signal DET includes a pen advance detection signal or a pen withdrawal detection signal. The pen advance detection signal is configured to detect whether the stylus 120 approaches the electronic device 110. The pen withdrawal detection signal is configured to detect whether the stylus 120 is distant from the electronic device 110. In other words, when the electronic device 110 is in the first mode (i.e., the hand-only mode), the processing unit 113 may be configured to determine whether the stylus 120 approaches the electronic device based on the signal frequency or the signal strength of the response signal RES received in response to the pen advance detection signal. When the electronic device 110 is in the second mode (i.e., the pen-and-hand mode), the processing unit 113 may be configured to determine whether the stylus 120 is distant from the electronic device based on the signal frequency or the signal strength of the response signal RES received in response to the pen withdrawal detection signal. In one embodiment, the processing unit 113 determines whether the response signal RES is a signal in response to the detection signal DET based on whether the response frequency of the response signal RES is the same as the detection frequency of the detection signal DET, so as to determine whether the object close to or away from the electronic device 110 is the detection stylus 120 to change the operation mode of the electronic device 110. In another embodiment, the processing unit 113 performs the above determination based on whether the signal strength or signal content of the response signal RES and the detection signal DET are related to each other, to which the disclosure is not limited.

For example, when the electronic device 110 is in the first mode (i.e., the hand-only mode), the processing unit 113 determines that the response signal RES is a signal in response to the detection signal DET (i.e., the pen advance detection signal) based on the response frequency of the response signal RES being the same as the detection frequency of the detection signal DET (i.e., the pen advance detection signal). In addition, the processing unit 113 may further include the pen-ring signal RING of the pen ring 122 of the stylus 120 based on the response signal RES received in response to the detection signal DET (i.e., the pen advance detection signal) to determine that the object close to the electronic device 110 is the stylus 120, such that the operation mode of the electronic device 110 is changed from the first mode (i.e., the hand-only mode) to the second mode (i.e., the pen-and-hand mode).

Similarly, when the electronic device 110 is in the second mode (i.e., the pen-and-hand mode), the processing unit 113 determines that the response signal RES is a signal in response to the detection signal DET (i.e., the pen withdrawal detection signal) based on the response frequency of the response signal RES being the same as the detection frequency of the detection signal DET (i.e., the pen withdrawal detection signal). And the processing unit 113 may further include the pen-ring signal RING of the pen ring 122 of the stylus 120 based on the response signal RES received in response to the detection signal DET (i.e., the pen withdrawal detection signal) to determine that the object distant from the electronic device 110 is the stylus 120 and thus change the operation mode of the electronic device 110 from the second mode (i.e., the pen-and-hand mode) to the first mode (i.e., the hand-only mode).

In one embodiment, the communication unit 112 includes, for example, a wired network module, a wireless network module, a Bluetooth module, an infrared module, a radio frequency identification (RFID) module, and a Zigbee network module, or a near-field communication (NFC) network module, but the disclosure is not limited thereto.

In one embodiment, the processing unit 113 includes, for example, a central processing unit (CPU), a microprocessor, a digital signal processor (DSP), a programmable controller, a programmable logic device (PLD), other similar devices, or a combination thereof. Furthermore, in one embodiment, each function of the processing unit 113 may be implemented as codes. The codes are stored in a memory, and these codes are executed by the processing unit 113. Or, in one embodiment, each function of the processing unit 113 may be implemented as one or more circuits. Note that the implementation of the functions of the processing unit 113 is not limited to software or hardware in the disclosure.

Figure 2:
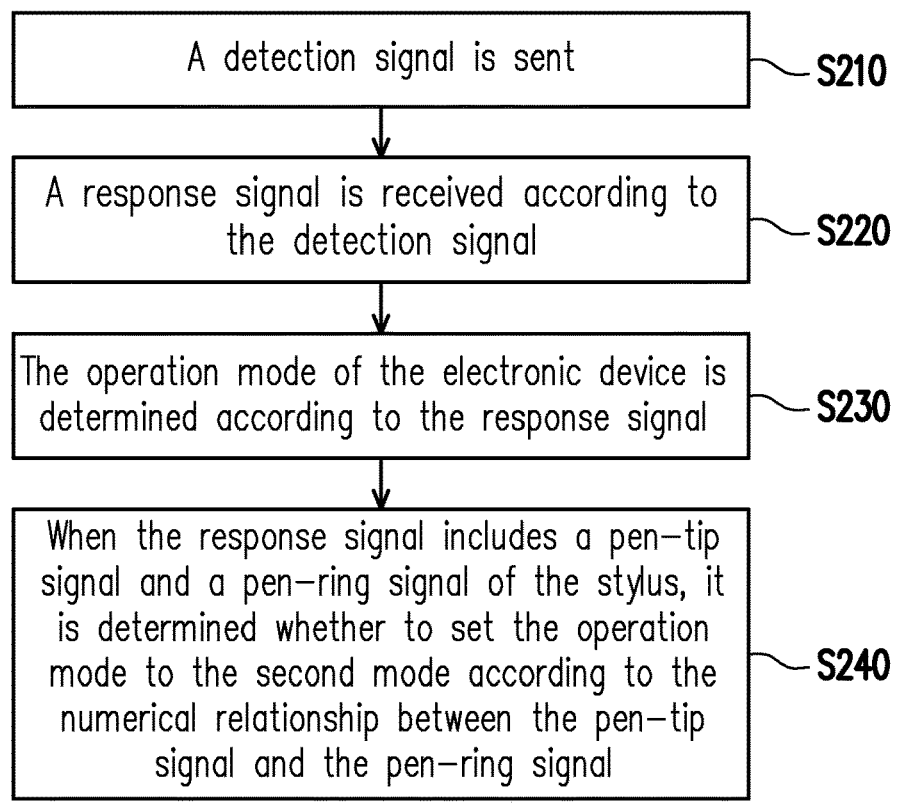
FIG. 2 is a flowchart of a detection method according to an embodiment of the disclosure.

FIG. 2 is a flowchart of a detection method according to an embodiment of the disclosure. In FIG. 1 and FIG. 2, the detection method of the present embodiment is adapted to determine the operation mode of an electronic device 110 including a touch panel 111. The detection method may include step S210, step S220, step S230, and step S240.

In step S210, a communication unit 112 sends a detection signal DET to detect a stylus 120. In step S220, the communication unit 112 receives a response signal RES according to the detection signal DET. In step S230, the processing unit 113 determines the operation mode of the electronic device 110 according to the received response signal RES. In other words, the processing unit 113 can detect the approach or withdrawal of the stylus 120 based on the response signal RES, so as to change the operation mode of the electronic device 110. In one embodiment, the operation mode includes a first mode and a second mode. The input signal source of the electronic device 110 in the first mode includes a finger, and the input signal source of the electronic device 110 in the second mode includes the finger and the stylus 120.

However, noise in the environment may interfere with the detection of the electronic device 110, thereby causing the electronic device 110 to enter an incorrect operation mode, compromising the user experience. For example, noise in the environment has a noise frequency, and when the noise frequency is similar to the frequency of the electronic device 110 for detecting the response signal RES of the stylus 120, the electronic device 110 may misjudge the approach or withdrawal of the object (e.g., finger) coupled with the noise as the approach or withdrawal of the stylus 120. In this case, the electronic device 110 may enter an incorrect operation mode, reducing the touch accuracy and compromising the user experience.

To solve this problem, in step S240, the response signal RES may include a pen-tip signal TIP and a pen-ring signal RING of the stylus 120. When a finger or an object coupled with noise approaches the electronic device 110, the frequency and the signal strength of the response signal RES received by the communication unit 112 are relatively simple. When the stylus 120 is close to the electronic device 110, the response signal RES received by the communication unit 112 includes the pen-tip signal TIP and the pen-ring signal RING. Moreover, the signal frequency and the signal strength of the pen-tip signal TIP and the pen-ring signal RING are different. The processing unit 113 confirms that the object close to the electronic device 110 is the stylus 120 according to the numerical relationship between the pen-tip signal TIP and the pen-ring signal RING.

In other words, the processing unit 113 can determine whether to set the operation mode of the electronic device 110 to the second mode (i.e., the pen-and-hand mode) according to the numerical relationship between the pen-tip signal and the pen-ring signal. Also, when the response signal RES does not include the pen-tip signal TIP and the pen-ring signal RING, the processing unit 113 can be configured to set the operation mode of the electronic device 110 to the first mode (i.e., the hand-only mode).

In one embodiment, the detection frequency of the detection signal DET is the same as the response frequency of the response signal RES. In addition, the pen-tip frequency of the pen-tip signal TIP may be higher than the pen-ring frequency of the pen-ring signal RING. For example, the pen-tip frequency may be 252 KHz, and the pen-ring frequency may be 176 KHz, but the disclosure is not limited thereto.

Therefore, even when the noise frequency of the noise is similar to the response frequency of the response signal RES, the electronic device 110 is prevented from misjudging the finger or the object coupled with the noise as the stylus 120. For example, the noise frequency may be the same as the pen-tip signal TIP of the response signal RES, but the noise frequency is different from the pen-ring signal RING of the response signal RES. Or, the noise frequency may be the same as the pen-ring signal RING of the response signal RES, but the noise frequency is not the same as the pen-tip signal TIP of the response signal RES. Because the finger does not have signals of two frequencies at the same time, the finger only has signals interfered with by the same frequency noise. In other words, the response signal RES having the two signal frequencies of the pen-tip signal TIP and the pen-ring signal RING is not interfered by noise or fingers.

In this way, the detection method of this embodiment may determine the operation mode of the electronic device 110 according to the detection signal DET and the response signal RES as a way to prevent the electronic device 110 from entering an incorrect operation mode and improve the user experience.

Figure 3:
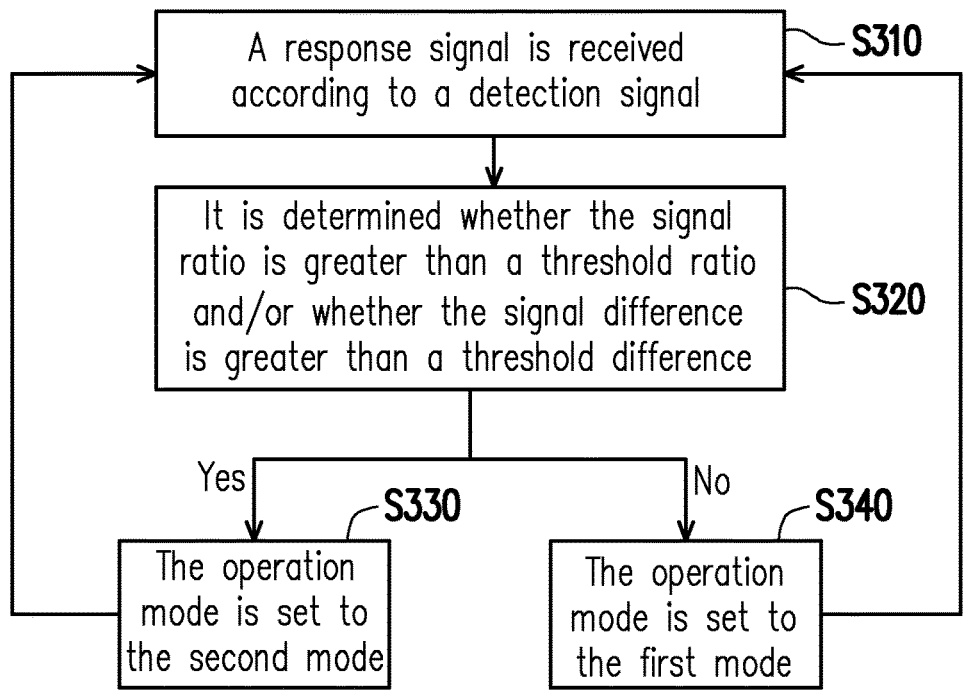
FIG. 3 is a flowchart of a detection method according to an embodiment of the disclosure.

FIG. 3 is a flowchart of a detection method according to an embodiment of the disclosure. In FIG. 1 and FIG. 3, the detection method of this embodiment is adapted to determine the operation mode of the electronic device 110 including a touch panel 111. The detection method may include step S310, step S320, step S330, and step S340.

In step S310, a communication unit 112 receives a response signal RES according to a detection signal DET.

In one embodiment, the detection signal DET and the response signal RES are azimuth signals. The electronic device 110 detects the approach and withdrawal of the stylus 120 more effectively and accurately with the frequency of one more set of the pen-ring signal RING and the numerical relationship between the pen-tip signal TIP and the pen-ring signal RING.

In one embodiment, the pen-tip signal TIP includes pen-tip position information of a pen tip 121 of the stylus 120 on the touch panel 111. Moreover, the pen-ring signal RING may include the pen-ring position information of the pen ring 122 of the stylus 120 on the touch panel 111. In one embodiment, the electronic device 110 receives a plurality of pen-tip signals TIP and a plurality of corresponding pen-ring signals RING respectively in a first direction or a second direction of the touch panel 111. The sequential signal strengths of the pen-tip signals TIP and the corresponding pen-ring signals RING in the first direction or the second direction are shown in Table 1 below.

TABLE 1

| TIP | 8 | 223 | 196 | 221 | 195 | 303 | 861 | 6364 | 4004 | 601 | 200 | 87 |
|---|---|---|---|---|---|---|---|---|---|---|---|---|
| RING | 95 | 111 | 165 | 190 | 299 | 434 | 503 | 662 | 660 | 533 | 311 | 227 |

After the communication unit 112 receives the response signal RES, the processing unit 113 selects from the pen-tip signals TIP the pen-tip signal TIP with the highest signal strength and the corresponding ring signal RING. For example, the processing unit 113 selects the pen-tip signal TIP with a signal strength of 6364 and the pen-ring signal RING with a signal strength of 662. Next, the processing unit 113 performs division and/or subtraction on the signal strengths of the pen-tip signal TIP and the pen-ring signal RING as selected to obtain a signal ratio and/or a signal difference. In other words, the numerical relationship may include a signal ratio obtained by the pen-ring signal RING dividing the pen-tip signal TIP and/or a signal difference obtained by subtracting the pen-ring signal RING from the pen-tip signal TIP.

In step S320, the processing unit 113 determines whether the signal ratio of the pen-tip signal TIP and the pen-ring signal RING is greater than a preset threshold ratio and/or whether the signal difference between the pen-tip signal TIP and the pen-ring signal RING is greater than a preset threshold difference. When the determination result of the processing unit 113 is "Yes," the process proceeds to step S330. When the determination result of the processing unit 113 is "No," the process proceeds to step S340.

In step S330, when the signal ratio is greater than the preset threshold ratio and/or the signal difference is greater than the preset threshold difference, the processing unit 113 is configured to set the operation mode of the electronic device 110 to the second mode (i.e., the pen-and-hand mode). Similarly, in step S340, when the signal ratio is not greater than the preset threshold ratio and/or the signal difference is not greater than the preset threshold difference, the processing unit 113 is configured to set the operation mode of the electronic device 110 to the first mode (i.e., the hand-only mode).

In this way, the detection method of this embodiment may determine the operation mode of the electronic device 110 according to the detection signal DET and the response signal RES, preventing the electronic device 110 from entering an incorrect operation mode, and improving the user experience.

Figure 4:
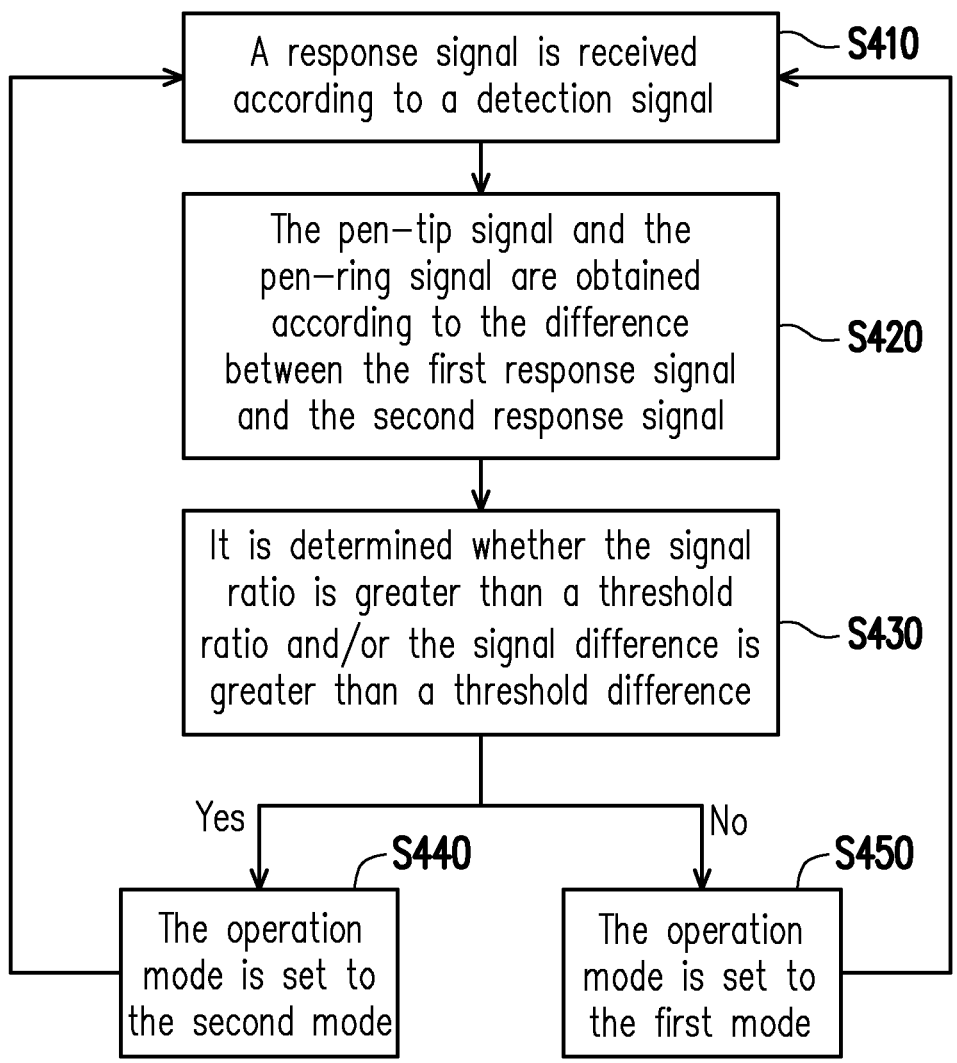
FIG. 4 is a flowchart of a detection method according to an embodiment of the disclosure.

FIG. 4 is a flowchart of a detection method according to an embodiment of the disclosure. In FIG. 1 and FIG. 4, the detection method of this embodiment is adapted to determine the operation mode of an electronic device 110 including a touch panel 111. The detection method may include step S410, step S420, step S430, step S440, and step S450.

In step S410, a communication unit 112 receives a response signal RES according to a detection signal DET.

In this embodiment, the detection signal DET includes a first detection signal and a second detection signal. The response signal RES may include a first response signal corresponding to the first detection signal and a second response signal corresponding to the second detection signal. In other words, instead of sending the signal for detecting the stylus 120 only once, the communication unit 112 sends the signal for detecting the stylus 120 twice. In addition, the communication unit 112 receives the corresponding first response signal and the corresponding second response signal according to the first detection signal and the second detection signal sent twice.

In one embodiment, the communication unit 112 is configured to send the first detection signal and the second detection signal continuously. In another embodiment, the communication unit 112 is configured to send the first detection signal and the second detection signal discontinuously. However, how the first detection signal and the second detection signal are sent can be designed depending on the need of design, to which the disclosure is not limited.

It should be noted that the stylus 120 may be configured to send the first response signal according to the first detection signal. Also, the stylus 120 may be configured not to respond to the second detection signal. In other words, the stylus 120 responds only to the first detection signal, but not to the second detection signal. In other words, it is possible that the first response signal includes the pen-tip signal TIP and the pen-ring signal RING of the stylus 120 while the second response signal does not include the pen-tip signal TIP and the pen-ring signal RING of the stylus 120.

In one embodiment, due to the noise in the environment, the first response signal may further include the noise in the environment in addition to the pen-tip signal TIP and the pen-ring signal RING of the stylus 120. Also, it is possible that the second response signal only includes noise in the environment. That is to say, both the first response signal and the second response signal include noise in the environment at the same time.

In step S420, the processing unit 113 is configured to obtain the pen-tip signal and the pen-ring signal according to the difference between the first response signal and the second response signal. In other words, the processing unit 113 may eliminate the noise of the first response signal according to the noise shared by the first response signal and the second response signal to generate a filtered response signal. That is to say, the processing unit 113 filters the first response signal according to the second response signal including only the noise to generate the filtered response signal, such that the filtered response signal only includes the pen-tip signal TIP and the pen-ring signal RING of the stylus 120.

Next, the processing unit 113 calculates the signal ratio and/or the signal difference based on the pen-tip signal TIP and the pen-ring signal RING of the filtered response signal. Specifically, the processing unit 113 divides the pen-tip signal TIP by the pen-ring signal RING to obtain the signal ratio. The processing unit 113 may also subtract the pen-ring signal RING from the pen-tip signal TIP to obtain the signal difference.

In step S430, the processing unit 113 is configured to determine whether the signal ratio is greater than the preset threshold ratio and/or the preset signal difference. When the determination result of the processing unit 113 is "Yes," the process proceeds to step S440. When the determination result of the processing unit 113 is "No," the process proceeds to step S450.

In step S440, when the signal ratio is greater than the preset threshold ratio and/or the signal difference is greater than the preset threshold difference, the processing unit 113 is configured to set the operation mode of the electronic device 110 to the second mode (i.e., the pen-and-hand mode). Similarly, in step S450, when the signal ratio is not greater than the preset threshold ratio and/or the signal difference is not greater than the preset threshold difference, the processing unit 113 is configured to set the operation mode of the electronic device 110 to the first mode (i.e., the hand-only mode).

It should be noted that the filtered response signal only includes the pen-tip signal TIP and the pen-ring signal RING of the stylus 120. Therefore, even when the noise in the environment includes the two frequencies same as those of the pen-tip signal TIP and the pen-ring signal RING, the processing unit 113 is still not interfered by the noise to determine the operation mode of the electronic device 110 accurately.

In this way, the detection method of this embodiment can determine the operation mode of the electronic device 110 according to the detection signal DET and the response signal RES to prevent the electronic device 110 from entering an incorrect operation mode and improve the user experience.

To sum up, by including the pen-tip signal and the pen-ring signal in the response signal, the electronic device and the detection method of the disclosure determine the operation mode of the electronic device according to the numerical relationship between the pen-tip signal and the pen-ring signal. In this way, the electronic device can detect the approach and withdrawal of the stylus effectively and accurately. Even if there is noise in the environment, the electronic device is still capable of not entering a wrong operation mode, improving the user experience.

Although the disclosure has been disclosed with the above examples, they are not intended to limit the disclosure. Anyone with ordinary knowledge in the technical field can make changes and modifications without departing from the spirit and scope of the disclosure. The protection scope of the disclosure shall be determined by the scope of the claims.

What is claimed is:

1. An electronic device, comprising:
  a touch panel;
  a network module, configured to send a detection signal, and receive a response signal based on the detection signal; and a processor, coupled to the touch panel and the network module, and configured to determine an operation mode of the electronic device based on the response signal, wherein the operation mode comprises a first mode and a second mode, an input signal source of the electronic device in the first mode comprises a finger, and the input signal source of the electronic device in the second mode comprises the finger and a stylus, when the response signal comprises a pen-tip signal of the stylus and a pen-ring signal of the stylus, the processor is configured to determine whether to set the operation mode to the second mode according to a numerical relationship between the pen-tip signal and the pen-ring signal.

2. The electronic device of claim 1, wherein the numerical relationship comprises a signal ratio obtained by the pen-ring signal dividing the pen-tip signal and/or a signal difference obtained by subtracting the pen-ring signal from the pen-tip signal, the processor is configured to set the operation mode to the second mode when the signal ratio is greater than a threshold ratio and/or the signal difference is greater than a threshold difference.

3. The electronic device of claim 2, wherein the processor is configured to set the operation mode to the first mode when the signal ratio is not greater than the threshold ratio and/or the signal difference is not greater than the threshold difference.

4. The electronic device of claim 1, wherein the processor is configured to set the operation mode to the first mode when the response signal does not comprise the pen-tip signal and the pen-ring signal.

5. The electronic device of claim 1, wherein the detection signal comprises a first detection signal and a second detection signal, and the response signal comprises a first response signal corresponding to the first detection signal and a second response signal corresponding to the second detection signal, and the processor is configured to obtain the pen-tip signal and the pen-ring signal according to a difference between the first response signal and the second response signal.

6. The electronic device of claim 5, wherein the stylus is configured to send the first response signal according to the first detection signal, and the stylus is configured to not respond to the second detection signal.

7. The electronic device of claim 5, wherein the network module is configured to send the first detection signal and the second detection signal continuously.

8. The electronic device of claim 5, wherein the network module is configured to send the first detection signal and the second detection signal discontinuously.

9. The electronic device of claim 1, wherein a detection frequency of the detection signal is the same as a response frequency of the response signal, and a pen-tip frequency of the pen-tip signal is higher than a pen-ring frequency of the pen-ring signal.

10. The electronic device of claim 1, wherein the detection signal comprises a pen advance detection signal or a pen withdrawal detection signal, when the operation mode is the first mode, the network module is configured to receive the response signal according to the pen advance detection signal, when the operation mode is the second mode, the network module is configured to receive the response signal according to the pen withdrawal detection signal.

11. The electronic device of claim 1, wherein the pen-tip signal comprises pen-tip position information of a pen tip of the stylus on the touch panel, and the pen-ring signal comprises pen-ring position information of a pen ring of the stylus on the touch panel.

12. A detection method for determining an operation mode of an electronic device including a touch panel, the detection method comprising:

sending a detection signal;

receiving a response signal according to the detection signal;

determining the operation mode based on the response signal, wherein the operation mode comprises a first mode and a second mode, an input signal source of the electronic device in the first mode comprises a finger, and the input signal source of the electronic device in the second mode comprises the finger and a stylus; and when the response signal comprises a pen-tip signal of the stylus and a pen-ring signal of the stylus, determining whether to set the operation mode to the second mode according to a numerical relationship between the pen-tip signal and the pen-ring signal.

13. The detection method of claim 12, wherein the numerical relationship comprises a signal ratio obtained by the pen-ring signal dividing the pen-tip signal and/or a signal difference obtained by subtracting the pen-ring signal from the pen-tip signal, when the signal ratio is greater than a threshold ratio and/or the signal difference is greater than a threshold difference, the operation mode is set to the second mode.

14. The detection method of claim 13, further comprising setting the operation mode to the first mode when the signal ratio is not greater than the threshold ratio and/or the signal difference is not greater than the threshold difference.

15. The detection method of claim 12, further comprising setting the operation mode to the first mode when the response signal does not comprise the pen-tip signal and the pen-ring signal.

16. The detection method of claim 12, wherein the detection signal comprises a first detection signal and a second detection signal, and the response signal comprises a first response signal corresponding to the first detection signal and a second response signal corresponding to the second detection signal, the pen-tip signal and the pen-ring signal are obtained according to a difference between the first response signal and the second response signal.

17. The detection method of claim 16, wherein the stylus is configured to send the first response signal according to the first detection signal, and the stylus is configured to not respond to the second detection signal.

18. The detection method of claim 16, further comprising sending the first detection signal and the second detection signal continuously.

19. The detection method of claim 16, further comprising sending the first detection signal and the second detection signal discontinuously.

20. The detection method of claim 12, wherein a detection frequency of the detection signal is the same as a response frequency of the response signal, and a pen-tip frequency of the pen-tip signal is higher than a pen-ring frequency of the pen-ring signal.

21. The detection method of claim 12, wherein the detection signal comprises a pen advance detection signal or a pen withdrawal detection signal, when the operation mode is the first mode, the response signal is received according to the pen advance detection signal, and when the operation mode is the second mode, the response signal is received according to the pen withdrawal detection signal.

22. The detection method of claim 12, wherein the pen-tip signal comprises pen-tip position information of a pen tip of the stylus on the touch panel, and the pen-ring signal comprises pen-ring position information of a pen ring of the stylus on the touch panel.

\* \* \* \* \*